(12) United States Patent
Onishi

(10) Patent No.: US 8,731,556 B2
(45) Date of Patent: May 20, 2014

(54) RADIOPHONE APPARATUS, HAND-OFF METHOD IN RADIOPHONE APPARATUS, AND COMMUNICATION SYSTEM

(75) Inventor: Kazuo Onishi, Kanagawa (JP)

(73) Assignee: Kyocera Corporation, Kyoto (JP)

(*) Notice: Subject to any disclaimer, the term of this patent is extended or adjusted under 35 U.S.C. 154(b) by 592 days.

(21) Appl. No.: 12/517,039

(22) PCT Filed: Nov. 19, 2007

(86) PCT No.: PCT/JP2007/072355
§ 371 (c)(1),
(2), (4) Date: May 29, 2009

(87) PCT Pub. No.: WO2008/065919
PCT Pub. Date: Jun. 5, 2008

(65) Prior Publication Data
US 2010/0003987 A1    Jan. 7, 2010

(30) Foreign Application Priority Data

Nov. 29, 2006    (JP) .................................. 2006-322669

(51) Int. Cl.
*H04W 36/00* (2009.01)
(52) U.S. Cl.
USPC ........... 455/436; 455/437; 455/442; 455/443; 455/444
(58) Field of Classification Search
USPC ........................... 455/436, 437, 442, 443, 444
See application file for complete search history.

(56) References Cited

U.S. PATENT DOCUMENTS 5,870,675 A * 2/1999 Tuutijarvi et al. ............ 455/436
6,826,161 B1 * 11/2004 Shahidi et al. ................ 370/331
(Continued)

FOREIGN PATENT DOCUMENTS

EP    1 887 823 A1    2/2008
JP    04-316225    11/1992
(Continued)

OTHER PUBLICATIONS

Japanese language office action dated Nov. 8, 2011 and its English language translation for corresponding Japanese application 2006322669 cites the foreign patent document above.

*Primary Examiner* — Justin Lee
(74) *Attorney, Agent, or Firm* — DLA Piper LLP (US)

(57) ABSTRACT

A wireless telephone device, a hand-off method in a wireless telephone device and a communication system are provided to enable the occurrence suppression of instant disconnection in a MAHHO as much as possible. A wireless telephone device (1) includes a communication unit (11) for selecting one of a plurality of frequencies to carry out wireless communication with a base station, a control unit (12) for switching a frequency used by the communication unit (11) to control the communication unit (11) and a speaker for outputting a communication voice in accordance with a voice signal received by the communication unit (11). When the communication unit (11) receives a command to carry out a complement processing for a hand-off candidate frequency during a telephone call, the control unit (12) makes the speaker output a pseudo voice and carries out the complement processing of switching the present frequency in use to the hand-off candidate frequency.

9 Claims, 4 Drawing Sheets

(56) References Cited

U.S. PATENT DOCUMENTS

| | | |
|---|---|---|
| 7,711,367 B2 * | 5/2010 | Cheng et al. ............... 455/439 |
| 7,787,880 B2 | 8/2010 | Ueda |
| 7,787,881 B2 | 8/2010 | Ueda |
| 7,895,629 B1 * | 2/2011 | Shen et al. ............... 725/62 |
| 2005/0020264 A1 * | 1/2005 | Akao et al. ............... 455/436 |
| 2006/0088000 A1 * | 4/2006 | Hannu et al. ............... 370/328 |
| 2006/0183482 A1 | 8/2006 | Ueda |
| 2006/0251130 A1 * | 11/2006 | Greer et al. ............... 370/508 |
| 2008/0162750 A1 * | 7/2008 | Sethi ............... 710/52 |
| 2009/0203381 A1 | 8/2009 | Ueda |

FOREIGN PATENT DOCUMENTS

| | | | | |
|---|---|---|---|---|
| JP | 09-009326 | 1/1997 | | |
| JP | 2003-244742 | 8/2003 | | |
| JP | 2006222845 A | 8/2006 | | |
| WO | WO 2005101877 A1 * | 10/2005 | ............... | H04Q 7/28 |
| WO | WO 2006062461 A1 * | 6/2006 | ............... | H04Q 7/28 |
| WO | WO 2006/109538 A1 | 10/2006 | | |

* cited by examiner

Prior Art

RADIOPHONE APPARATUS, HAND-OFF METHOD IN RADIOPHONE APPARATUS, AND COMMUNICATION SYSTEM

CROSS-REFERENCE TO THE RELATED APPLICATIONS

This application is a national stage of international application No. PCT/JP2007/072355 filed Nov. 19, 2007, which also claims the benefit of priority under 35 USC 119 to Japanese Patent Application No. 2006-322669 filed Nov. 29, 2006, the entire contents of which are incorporated herein by reference.

TECHNICAL FIELD

The present invention relates to a radiophone apparatus performing hand-off, a hand-off method in a radiophone apparatus, and a communication system.

BACKGROUND ART

In recent years, multiband compatible radiophone apparatuses which can utilize a plurality of frequency bands have been developed. In these multiband compatible radiophone apparatuses and wireless communication systems utilizing a plurality of frequency bands, when the radiophone apparatus moves, it becomes necessary to switching from a base station communicated with at present to a base station using a different frequency band.

The function of switching base stations (communication channels) communicated with is called "hand-off" (or "hand-over"). Hand-off includes two types: soft hand-off and hard hand-off (see, for example, Patent Document 1).

"Soft hand-off" is hand-off performed without switching frequencies. The base station communicated with at present (handing-off channel) and the base station desired to be newly communicated with (handed-off channel) are temporarily set in a state of simultaneous communication, then the processing for switching the base stations is carried out.

As described above, in soft hand-off, the radiophone apparatus is always communicating with one or more base stations, therefore communication is not interrupted at the time of hand-off.

However, soft hand-off is not always possible (soft hand-off cannot be carried out in a case where two base stations cannot provide services to a radiophone terminal by the same frequency), therefore hard hand-off is carried out.

"Hard hand-off" maintains communication with a first base station up to just before switching communication to a second base station when changing from the first base station to the second base station, then switches the frequency band. For this reason, the channel in use ends up being temporarily released, so communication ends up being interrupted transiently when switching frequency bands.

Patent Document 1: Japanese Patent Publication (A) No. 2003-244742

DISCLOSURE OF THE INVENTION

Problem to be Solved by the Invention

In the hard hand-off described above, the radiophone apparatus measures the energy strengths of pilot signals of all base stations in a list of nearby base stations having different frequencies received from the first base station. At this time, it temporarily switching frequency from the frequency at the time of communication with the first base station for the measurement, therefore there was the inconvenience that the signal with the first base station ended up being temporarily interrupted (transient interruption) and, for example, a period of sound loss ended up occurring during call.

In order to suppress transient interruption, the number of times and durations of switching of frequencies may be suppressed. In order to suppress the number of times and durations of switching, the number of base stations (channels) to be measured for energy strength of pilot signals may be decreased. In a conventional hard hand-off, however, if the number of base stations (channels) measured is decreased, the possibility grows that the base station (channel) effective as the destination of hand-off cannot be found, so the possibility rises of the hand-off ending up failing.

The present invention was made in order to overcome the problem described above and has as an object thereof to provide a radiophone apparatus, a hand-off method in a radiophone apparatus, and a communication system not allowing a user to be aware of the occurrence of transient interruption as much as possible in hard hand-off and thereby enabling pleasant communication.

Means for Solving the Problem

A radiophone apparatus of a first aspect of the present invention is provided with a communication part selecting one frequency from among a plurality of frequencies and performing wireless communication communicating with a base station, a control part switching a frequency used by the communication part and controlling the wireless communication, and a speaker outputting call voice based on a voice signal received by the communication part, wherein the control part makes the speaker output a pseudo voice and switches the frequency in use at present to a hand-off candidate frequency to perform the capture processing, when a search request requesting processing for capture of hand-off candidate frequencies is received by the communication part during call.

Further, the radiophone apparatus is characterized in that the control part suspends output of the pseudo voice and returns to the frequency before the switching when ending the capture processing.

Further, the radiophone apparatus is characterized in that the radiophone apparatus further has a memory part, and in that the control part makes the memory part store the call voice data based on the voice signal received by the communication part and makes the speaker output the voice of the stored call voice data as the pseudo voice.

Further, the radiophone apparatus is characterized in that the control part starts storage of the voice data based on the voice signal received by the communication part in the memory part when the communication part receives the search request, stops storage of the voice data based on the received voice signal before switching the frequency to be used by the communication part from the frequency in use at present to a hand-off candidate frequency, then makes the speaker output the call voice based on the stored call voice data.

Further, the radiophone apparatus is characterized in that the control part outputs the pseudo voice when a request for performing the processing for capture of the hand-off candidate frequencies several times is received as the search request.

Further, the radiophone apparatus is characterized in that the radiophone apparatus further includes a memory part, and in that the control part makes the memory part store the call voice data based on the voice signal received at the communication part until the frequency in use at present is switched to a hand-off candidate frequency and makes the speaker output the call voice based on the stored call voice data as the pseudo voice when a request of performing the capture processing search several times is received.

A hand-off method in a radiophone apparatus of a second aspect of the present invention is a hand-off method for continuing wireless communication by switching a communication channel from a base station in communication at present to another base station in a radiophone apparatus engaging in wireless communication with a plurality of base stations, the method including a reception step of receiving a search request of hand-off candidate frequencies during call, a capture processing step of switching from the frequency in use at present to a hand-off candidate frequency and performing capture processing after the reception step, a storing step of storing a call voice data based on a received voice signal between the reception step and the capture processing step, and a voice outputting step of outputting the voice based on the call voice data stored at the storing step during the processing of the capture processing step.

Further, the above hand-off method is characterized by further having a return step of stopping the call voice outputting step, then returning to the frequency before the switching when the capture processing step ends.

A communication system of a third aspect of the present invention has a base station and a radiophone apparatus selecting one frequency from among a plurality of frequencies and performing wireless communication communicating with the base station, wherein the radiophone apparatus is provided with a communication part, a control part switching a frequency used by the communication part and executing the wireless communication, and a speaker outputting call voice based on a voice signal received by the communication part, the control part makes the speaker output a pseudo voice and switches the frequency in use at present to a hand-off candidate frequency to perform the capture processing, when a search request requesting processing for capture of hand-off candidate frequencies is received by the communication part during call.

Effects of the Invention

According to the present invention, a radiophone apparatus, a hand-off method in a radiophone apparatus, and a communication system not allowing a user to be aware of the occurrence of transient interruption as much as possible in hard hand-off and thereby enabling pleasant communication can be provided.

EXPLANATION OF NOTATIONS

Figure 1:
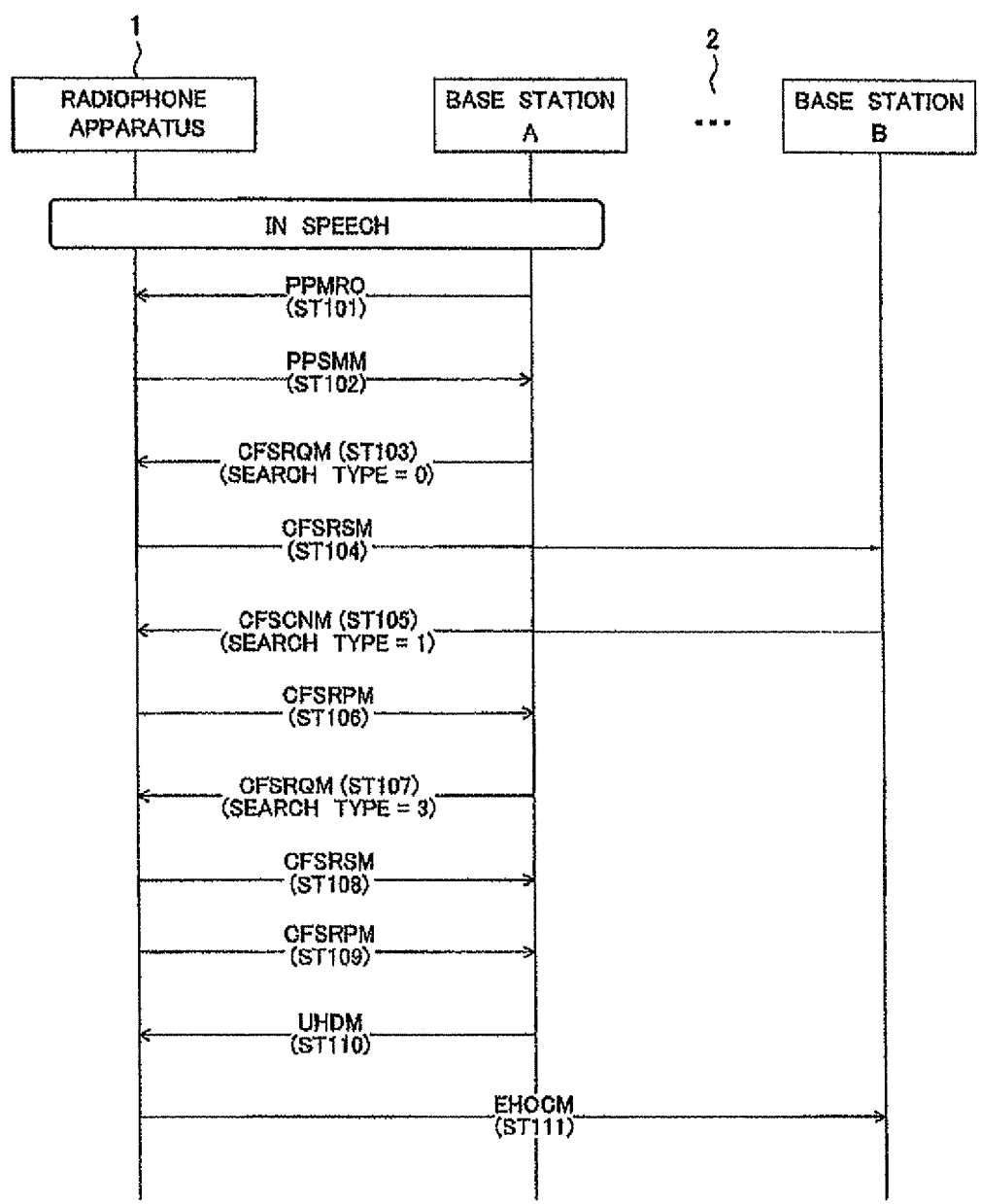
FIG. 1 A diagram cited for explaining a representative sequence of a wireless communication system when performing a MAHHO operation.

1 . . . radiophone apparatus, 11 . . . communication part, 12 . . . control part, 13 . . . memory part, 14 . . . voice processing part, 15 . . . speaker (SP), 16 . . . microphone (MIC), 17 . . . display part, 18 . . . operation part, 120 . . . hand-off processing part, 121 . . . message exchange part, 122 . . . parameter memory part, 123 . . . search control part, 124 . . . pilot signal strength measurement part, 125 . . . frequency setting part, 126 . . . call voice recording and/or output part, 127 . . . call voice output path switching part, and 128 . . . recorded voice file.

BEST MODE FOR CARRYING OUT THE INVENTION

Below, an explanation will be given of a hand-off method in a radiophone apparatus and a wireless communication system according to embodiments of the present invention. Before that, an explanation will be given with reference to FIG. 1 of a representative sequence of a wireless communication system in a case where when a radiophone apparatus 1 is communicating using a base station 2 (base station A), its base station performs a MAHHO operation for a base station 2 with a different frequency (base station B).

In recent years, effective utilization of the frequency bands used in a wireless communication system has been promoted. Reorganization of frequency bands has been studied for making the used frequency bands match with global standards and specifications.

For example, in a wireless communication system using CDMA2000 1x (Code Division Multiple Access 2000 1x), at present, in Japan, the Japanese specification 800 MHz band (hereinafter referred to as "the old 800 MHz band") is being used, but there are plans for reorganizing this frequency band to a new 800 MHz band of the global standards and specifications. Note that, the old 800 MHz band and the new 800 MHz band differ in allocation of the frequency bands used for uplink and downlink etc.

In view of this background, multiband compatible radiophone apparatuses capable of communication by the present frequency band (old 800 MHz band), new frequency band (new 800 MHz band), and high frequency band (2 GHz band) are being developed.

In the CDMA2000 1x, one of the base stations has one or more sectors divided by a pilot code. Each sector is assigned one channel for communication.

Further, the radiophone apparatus uses any of the channels to communicate with the base station. Below, a simple explanation will be given using an example where one base station has one pilot code linked with the base station (that is, one base station is assigned only one channel).

In a multiband compatible radiophone apparatus capable of utilizing a plurality of frequency bands described above and a wireless communication system utilizing a plurality of frequency bands, when the radiophone apparatus moves, the necessity of the switching operation arises for switching from the base station communicated with at present to a base station with a different frequency band.

The function of switching base stations (communication channels) for performing communications is called "hand-off" (or hand-over). Hand-off includes two types: soft hand-off and hard hand-off.

"Soft hand-off" is hand-off carried out without switching frequencies and is a hand-off method inherent to CDMA. The base station communicated with at present (handing-off channel) and the base station to be newly communicated with (handed-off channel) are temporary set in a state of simultaneous communication, then processing for switching base stations is carried out.

Specifically, the base station communicated with at present outputs a list of nearby base stations. A radiophone apparatus receives this list and measures a signal strength of the pilot signal with each base station on the list. The radiophone apparatus transmits the result of this measured strength to the base station communicated with at present, then the base station determines the base station to be handed off to based on the result. Due to this, hand-off not accompanied with a change of the frequency band (change of the communication system) is carried out under the guidance of the base station.

As described above, in soft hand-off, the radiophone apparatus is always communicating with one or more base stations, therefore the communication is never interrupted at the time of hand-off.

However, soft hand-off is not always possible (soft hand-off cannot be carried out in a case where two base stations cannot provide services to a radiophone terminal by the same frequency etc.), therefore hard hand-off is carried out.

"Hard hand-off" maintains the communication with a first base station up to just before the switching of the communication to a second base station, then switches the frequency band when changing communication from the first base station to the second base station. For this reason, the channel in use ends up being temporarily released, so transient interruption of the communication occurs at the time of switching of the frequency bands.

In the CDMA2000 1x scheme, one of the IMT-2000 standards, when hard hand-off is carried out, two schemes of DAHHO (Data Assisted Hard Hand OFF) and MAHHO (Mobile Assisted Hard Hand OFF) can be utilized.

Below, each will be explained. Namely, DAHHO is a scheme where a radiophone terminal does not perform a search of other frequencies before the hand-off, but hand-off is executed to a second base station directly designated by the first base station.

Further, in DAHHO, information of the radiophone terminal is not referred to. The first base station one-sidedly designates the second base station. Therefore, there is no guarantee that a radiophone terminal can capture the second base station designated by the first base station, so the possibility of failure in the hand-off is relatively high.

On the other hand, in MAHHO, the radiophone terminal receives a list of nearby base stations (channels) with different frequency bands designated from the first base station being communicated with at present and performs a search of base stations (channels) on the list by switching just for an instant to the frequency of the list designated according to a search command from the first base station.

In the search of base stations on the list, the radiophone terminal measures energy strengths of pilot signals with all base stations (channels) on the list. The radiophone terminal switches the frequency back to the original frequency again and reports the measured energy strengths of all base stations (channels) to the first base station, then the first base station determines the second base station from among the base stations on the list based on the reported energy strengths. Then, its first base station transmits an instruction to the radiophone terminal for switching the communication to the second base station, then the radiophone terminal executes the hand-off according to this instruction.

As described above, MAHHO is a method where a base station 2 of the CDMA determines a base station 2 for hard hand-off based on energy strengths of base stations measured by the radiophone apparatus 1 acting as a radiophone station. MAHHO has the effects of raising a rate of success of the hard hand-off between frequencies and making interruption of a call harder.

MAHHO monitors the result of the pilot signal strength measurement reported from the radiophone apparatus 1 provided in a PPSMM (Periodic Pilot Strength Measurement Message) and starts the hand-off when the energy strength of the its own station becomes a constant or less, so is called as "PPSMM based".

Specifically, in FIG. 1, the base station 2 (base station A) sends a pilot signal strength measurement request of a PPMRO (Periodic Pilot Measurement Request Order) to the radiophone apparatus 1 (ST101) and requests the radiophone apparatus 1 periodically report the received energy strength of its own station.

Contrary to this, the radiophone apparatus 1 sends a PPSMM (Periodic Pilot Strength Measurement Message) to the base station 2 and reports the energy strength in the base station 2 (ST102).

The report is periodically sent at an interval designated by the previous PPMRO (0.8 to 10.08 seconds, usually about 2 to 4 seconds). However, limited to a case where the threshold value is designated by the PPMRO, the radiophone apparatus 1 is exempted from reporting during a period where the threshold value is not satisfied for the purpose of avoiding traffic congestion.

Next, the base station 2 (base station A) judges the energy strength of its own station reported by the PPSMM and regards a case where the energy strength becomes less than a certain level as a possibility of loss of a call. At this time, in order to reduce this possibility, the base station 2 (base station A) sends to the radiophone apparatus 1 a candidate frequency search request message (CFSRQM) (ST103) and reports the frequency of the hand-off candidate system, list of base stations, search window size, search interval, threshold value, and other parameters.

Here, one of the important parameters is the search type. This indicates either of three stages of "0=search stop", "1=single search start", and "3=periodic search start". "0=search stop" can be used when only information of various types of parameters is transferred to the radiophone apparatus 1, and an actual search is not carried out, but stopped. "1=single search start" can be used when the radiophone apparatus 1 is made to perform a search only one time and then made to report the result. "3=periodic search start" can be used when the radiophone station is made to periodically perform a search and made to periodically report the result.

A network can selectively use the three search types in accordance with the state of traffic or geographical situation.

Then, the radiophone apparatus 1 sends a candidate frequency search response message (CFSRSM) to the base station 2 (base station B) to report the fact that the radiophone apparatus it received the CFSRQM (ST104). Contrary to this, the base station 2 (base station B) sends a CFSCNM (Candidate Frequency Search Control Message) to the radiophone apparatus 1 to designate the search type as "1=single search start" (ST105).

Here, unlike the CFSRQM, no parameter other than the search type is delivered, therefore the influence exerted upon the traffic is light and weak. In a state where parameters such as the frequency of the frequency system of the hand-off candidate system and the pilot list are fixed in nature and are seldom changed, the network can use the CFSCNM so as not to exert an influence upon the traffic limited to when only a change of the search type is to be carried out.

Next, the radiophone apparatus 1 sends a candidate frequency search report message (CFSRPM) to the base station 2 (base station A) to report the results of measurement of the pilots of the candidate system designated by the CFSRQM (ST106). At this time, a candidate frequency search (CFS) is carried out. If a base station with a candidate frequency having a strength strong enough for the hand-off is reported at this point of time, the base station 2 (base station A) can request the radiophone apparatus 1 to perform the hand-off. When the hand-off condition is not satisfied, the base station 2 (base station A) continuously sends the CFSRQM and designates the search type as "3 periodic search start" (ST107).

Then, the radiophone apparatus 1 sends the candidate frequency search response message (CFSRSM) to the base station 2 (base station A) to report that the phone received the CFSRQM (ST108).

The radiophone apparatus 1 sends the CFSRPM to the base station 2 (base station A) and periodically reports the measurement results of the pilots of the candidate system designated by the CFSRQM (ST109). At this time, a candidate frequency search (CFS) is carried out.

The report is periodically sent by a search period designated by the CFSRQM (0.48 to 200 seconds, usually about 2 to 4 seconds). However, limited to the case where the threshold value is designated by the CFSRQM, the radiophone apparatus 1 is exempted from reporting during the period where the threshold value is not satisfied for the purpose of avoiding traffic confusion.

Upon receipt of the report of a base station satisfying the hand-off, the base station 2 (base station A) sends a universal hand-off direction message (UHDM) to the radiophone apparatus 1 and requests hand-off to the base station 2 (base station B) with the candidate frequency (ST110).

The radiophone apparatus 1 executes the hand-off as designated and sends an extended hand-off completion message (EHOCM) to the new base station 2 (base station B), whereby the MAHHO operation is completed (ST111).

As described above, MAHHO is a hand-off scheme in which in the middle of communicating with a certain base station 2 (base station A), the radiophone apparatus 1 switches from the frequency used at present to another frequency so as to search for another base station 2 (base station B) having a strong signal strength pilot signal and then switches the communication to the base station 2 (base station B) having the strongest signal strength.

Note a switch of the frequency occurs at the time of the hand-off candidate frequency search according to MAHHO, therefore, the voice during call ends up being interrupted. In particular, during execution of the "periodic search start request" of the search type=3, usually the voice is heard with an interruption at intervals of 2 to 4 seconds, so the uncomfortable feeling given to the user becomes large.

Figure 2:
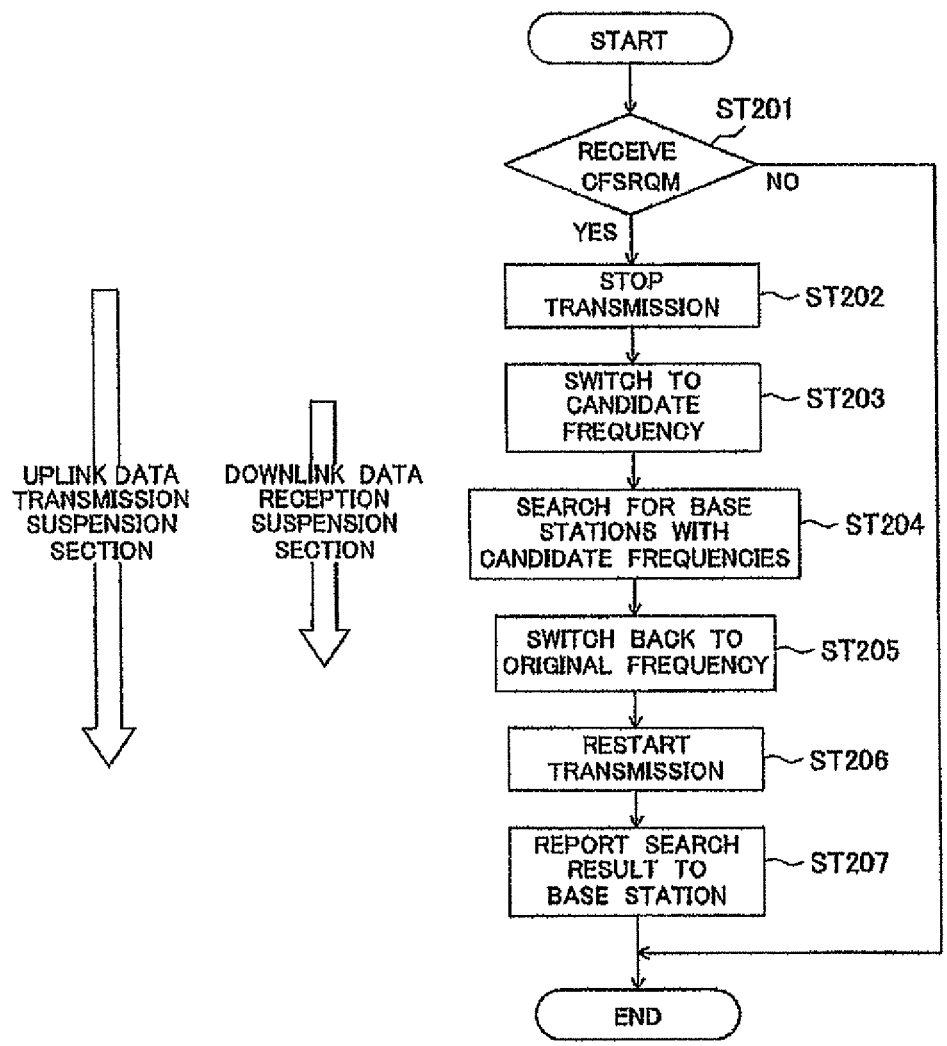
FIG. 2 A flow chart cited for explaining the operation of a radiophone apparatus when using MAHHO.

Specifically, as shown in the flow chart of the flow of processing for searching for a hand-off candidate frequency in FIG. 2, when a CFSRQM of the search type=3 is transmitted from the base station 2, the CFSRQM is received, and the search of the hand-off candidate frequency is started (ST201 "Yes"), the radiophone apparatus 1 first stops the transmission (ST202). Then, the radiophone apparatus 1 executes a search of the base station with this candidate frequency by switching to the hand-off candidate frequency (ST203, ST204), switches back to the original frequency when this ends, and restarts the transmission (ST205, ST206).

For this reason, the transmission data (voice) during this is not transmitted, but discarded, and the reception data (voice) is not received either, so the call state becomes silent. This silent section is only less than 200 milliseconds at the maximum. However, in the case of voice, particularly continuous sound, an interruption of sound can be relatively clearly recognized.

Note that ST202 to ST206 is an uplink data transmission suspension section, and ST203 to ST205 is a downlink data reception suspension section. Then, finally, the hand-off candidate frequency search result is reported as CFSRPM to the base station 2 issuing the request (ST207).

For this reason, in the radiophone apparatus according to the embodiment of the present invention which will be explained below, the mechanism was constructed so that, by recording the received call voice at the time of reception of the start request of the hand-off candidate frequency search from the base station 2 and reproducing and outputting it matching with the section of the sound interruption during the hand-off candidate frequency search, the user is prevented from being aware of the sound interruption section. A detailed explanation will be given below.

Figure 3:
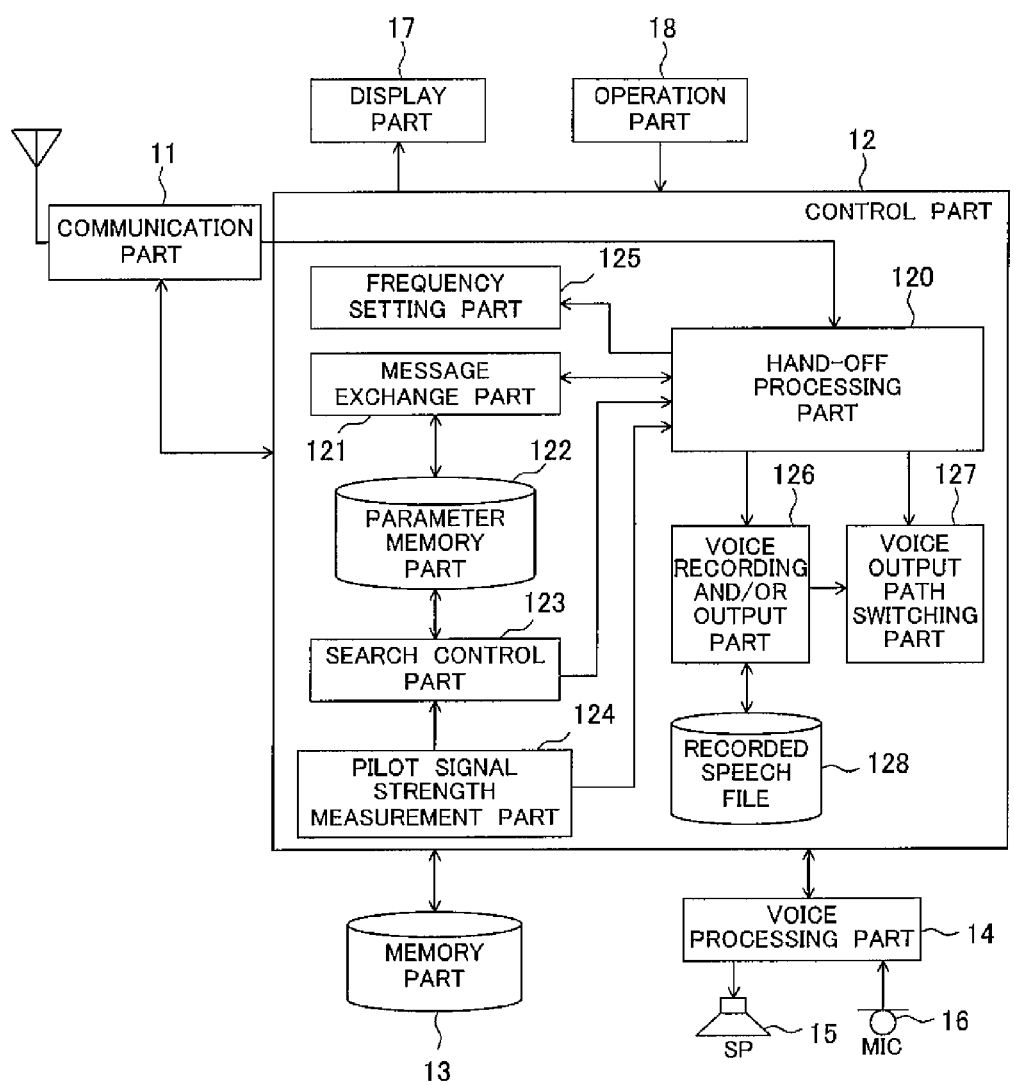
FIG. 3 A block diagram showing the configuration of a radiophone apparatus according to an embodiment of the present invention.

FIG. 3 is a block diagram showing the configuration of an inside of a radiophone apparatus according to an embodiment of the present invention. As shown in FIG. 3, the radiophone apparatus 1 is configured by a communication part 11, control part 12, memory part 13, voice processing part 14, speaker 15 (SP), microphone 16 (MIC), display part 17, and operation part 18.

The communication part 11 transmits and receives wireless signals through a channel assigned by either of the base stations 2, with this base station 2.

This communication part 11 can transmit and receive wireless signals by a plurality of frequency bands. Specifically, the communication part can transmit and receive wireless signals using the existing frequency band (old 800 MHz band), new frequency band (new 800 MHz band), and high frequency band (2 GHz band).

Note that the above communication systems using different frequency bands are assigned "band classes" prescribed by the 3GPP2 (3rd Generation Partnership Project 2) as identification numbers for the base stations 2 and the radiophone apparatuses 1 to identify the frequency bands. For example, in a list of nearby base stations (N-list) etc. in information informed from a base station 2 to the radiophone apparatus 1, these band classes are used for reporting the communication systems existing around the radiophone apparatus 1 to the radiophone apparatus 1 and so on.

Note that, the present frequency band (old 800 MHz band) is classified as the "band class 3", the new frequency band (new 800 MHz band) is classified as the "band class 0", and the high frequency band (2 GHz band) is classified as the "band class 6". Degrees of priority are set in advance for these frequency bands. The degree of priority of the band class 6 is the highest, next the band class 0, and the degree of priority of the band class 3 is the lowest.

Further, the band classes and degrees of priority explained here are only examples and are largely governed by the infrastructure of the telecommunications carrier.

The communication part 11 identifies the frequency band at the time of communication with the base station 2 according to the above band classes.

The control part 12 controls the operation of the radiophone apparatus 1. Specifically, the control part 12 outputs a voice signal (voice data) included in the signal output from the communication part 11 to the voice processing part 14 and outputs a voice signal output from the voice processing part 14 to the communication part 11.

Further, the control part 12 controls which among the plurality of frequencies is to be used by the communication part 11 to transmit and receive the wireless signal and makes the communication part 11 execute the hand-off in response to a hand-off request from the base station 2. The "hand-off" means processing for switching the communication target from a base station 2 communicated with at present to another base station, that is, a change of channels.

Further, the control part 12 executes recorded call voice output processing outputting the already recorded received voice when the communication part 11 receives a request for search of the hand-off candidate frequencies from a base station 2 in the middle of the call voice and switches the frequency being used at present to a hand-off candidate frequency to perform a capture operation and stopping the recorded call voice output before the search of the hand-off candidate frequency is completed and the frequency before the switching is reset to.

The control part 12 executes the recorded voice output processing when receiving a periodic search start request making it periodically perform a search of base stations with hand-off candidate frequencies and successively report the results and does not execute the recorded voice output processing when receiving a single search start request making it perform a search of the hand-off candidate frequencies only one time and report the results.

The control part 12, specifically, starts buffering the voice after receiving a periodic search start request for making it periodically perform a search of base stations with hand-off candidate frequencies and successively report the result and stops the buffering and outputs the buffered voice when a switching of frequencies occurs.

For this reason, the control part 12 is configured by a hand-off processing part 120, message exchange part 121, parameter memory part 122, search control part 123, pilot signal strength measurement part 124, frequency setting part 125, voice recording and/or output part 126, voice output path switching part 127, and recorded voice file 128.

The message exchange part 121 exchanges the various types of messages shown in FIG. 1 (PPMRO, PPSMM, CFSRQM, CFSRSM, CFSCNM, CFSRPM, CFSRSM, CFSRPM, UHDM, and EHOCM) in order for the radiophone apparatus 1 to execute the MAHHO sequence with the base station 2. Among those, the frequency of the hand-off candidate communication system, list of base stations, search window size, search interval, search type, threshold value, and other various parameters attached to a search request message (CFSRQM) transmitted from the base station 2 are held in the parameter memory part 122.

Note that, the parameter memory part 122 is actually assigned to and held in a predetermined region of the memory part 13.

The search control part 123, under the control of the hand-off processing part 120, performs a pilot search of the nearby base stations 2 during the communication and the base stations 2 switched at the time of the hand-off based on various types of parameters held in the parameter memory part 122.

Here, the "pilot search" means processing setting a search window and searching including the multiple paths of the pilot channel useable in this search window.

The pilot signal strength measurement part 124 measures the signal strength of the pilot signal from the base station 2 (that is, the strength of the signal for each channel divided to pilot signals and the strength of the channel signal to be used in a wave which can be received by the communication part 11).

The method of the signal strength measurement includes a method of measuring the energy strength of the pilot signal. However, here, the method of the signal strength measurement is not limited. Further, the frequency setting part 125 performs the frequency switching control of the communication part 11 in accordance with the frequency assignment of the new base station shown in the hand-off instruction analyzed by the hand-off processing part 120 as will be explained later.

The voice recording and/or output part 126 starts recording the received voice at a timing of reception of the search request of the hand-off candidate frequency from the base station 2 during the call, stores the received voice in the recorded voice file 128 before executing search processing, reads out the recorded voice from this recorded voice file 128 during execution of the search processing, and plays the voice back by the speaker 15 through the voice processing part 14 which will be explained later. As the recorded voice file 128, for example, a ring buffer is used. The capacity should be large enough to assign a buffer region capable of storing 200 milliseconds' worth of the received voice at the maximum.

When the end of the buffer region is reached during the recording, the recording is continuously carried out by returning back to the head of the buffer region. The reproduction is carried out from the oldest data in the buffer. By performing FIFO (First-In First-Out) control in this way, so far as 200 milliseconds' worth of the received voice can be once recorded, no matter when the recording ends after that, an amount of voice back-up necessary for preventing the user from being aware of a silent section can be obtained.

Note that recording and outputting voice of another party in the conversation is not liable to cause any strange feeling since they resemble the voice and sound of the other party in the conversation ending up being lost during the search processing. However, even by outputting only white noise (a frequency near the sound of a human being is preferable), the strange feeling given to the user can be reduced more than the case where nothing is output from the speaker 15 during the search processing.

The voice output path switching part 127 performs control for switching the voice played back at the speaker 15 through the voice processing part from the recorded voice to the voice at a timing of stopping the output of the recorded voice when the search processing is completed and the original frequency before the switching is reset to.

Note that, the hand-off processing part 120, when receiving a Universal Hand Off Direction Message (UHDM) from the base station 2, controls each of the above message exchange part 121, search control part 123, pilot signal strength measurement part 124, and frequency setting part 125 to executes the hand-off processing. Specifically, it analyzes the Universal Hand Off Direction Message (UHDM) and identifies the sort of the hand-off (distinguishing between soft hand-off and hard hand-off), frequency assignment, pilot PN code sequence, search window information, etc.

Further, the hand-off processing part 120 controls the voice recording and output part 126, the voice output path switching part 127, and recorded voice file 128. Then, the hand-off processing part 120, during call, when receiving the search request of the hand-off candidate frequency from the base station 2, switching from the frequency in use at present to the hand-off candidate frequency, and performing the capture operation, executes the recorded voice output processing of activating the voice recording and/or output part 126, outputting the reception voice which has been recorded in advance in the recorded voice file 128, and suspending the recorded voice output before the search of the hand-off candidate frequency is completed and the frequency before the switching is restored as well.

The hand-off processing part 120, when receiving a periodic search start request for making it periodically perform a search of base stations with hand-off candidate frequencies and report the result in detail, activates the voice recording and/or output part 126 and makes it execute the recorded voice output processing. Then, if the hand-off processing part 120 is configured so as not to execute the recorded voice output processing when receiving a single search start request for performing a search of the hand-off candidate frequencies only one time and reporting the result, since the interruption of sound occurs only one time and the feeling of strangeness to the user is originally small, the processing amount does not increase.

The voice recording and/or output part 126, specifically, starts the buffering processing of the voice by using the voice recording file 128 after receiving the periodic search start request for making it periodically perform a search of base stations with hand-off candidate frequencies and report the result in detail, suspends the buffering processing to the voice recording file 128 when switching of frequencies occurs, and outputs the buffered voice. Further, even in a case where not recorded voice, but only white noise or the like is output, the timing of output is the same.

Note that, the function of each of the blocks 120 to 128 described above is achieved by the control part 12 reading out and executing a respective program stored in the memory part 13. Only blocks substantially differentiated from other blocks and built-in the control part 12 are not pointed out. Processing parts are separately expressed only for simplification of explanation.

The memory part 13 stores various types of data utilized for the processing in the control part 12. The memory part 13 holds, for example, programs of a computer provided in the control part 12, an address book for managing personal information such as phone numbers and e-mail addresses of other parties, a voice file for playing back an incoming call sound and an alarm sound, an image file for the standby screen, various types of setting data, temporary data utilized in the processing process of the programs, and so on.

Note that, the above memory part 13 is configured by, for example, a nonvolatile memory device (nonvolatile semiconductor memory, hard disc device, optical disc device, etc.), a random accessible memory device (for example, SRAM or DRAM), or the like.

Further, the voice processing part 14 performs the processing of the voice signal received at the communication part 11 and output at the speaker 15 and voice signal input at the microphone 16. Namely, the voice processing part 14 amplifies the voice input from the microphone 16, performs analog-to-digital conversion, and further applies encoding or other signal processing to this to convert it to digital voice data which it outputs to the control part 12.

Further, the voice processing part 14 applies decoding, digital-to-analog conversion, amplification, or other signal processing to the voice data supplied from the control part 12 to convert it to an analog voice signal which it outputs to the speaker 15.

The display part 17 is configured by using, for example, a liquid crystal display panel, an organic EL (Electro-Luminescence) panel, or other display device and displays an image in accordance with a video signal supplied from the control part 12. The display part 17 displays, for example, a phone number of a destination at the time of a send operation, a phone number of the other party at the time of reception, contents of received mail and transmitted mail, the date, the time, the remaining battery power, the success of a send operation, a waiting screen, and other various information and images.

Further, the operation part 18 has, for example, a power key, speak key, number keys, letter keys, direction keys, an execute key, a send key, and other keys to which various functions are assigned. When these keys are operated by the user, the operation part 18 generates signals corresponding to those operation contents and inputs these as an instruction of the user to the control part 12.

Figure 4:
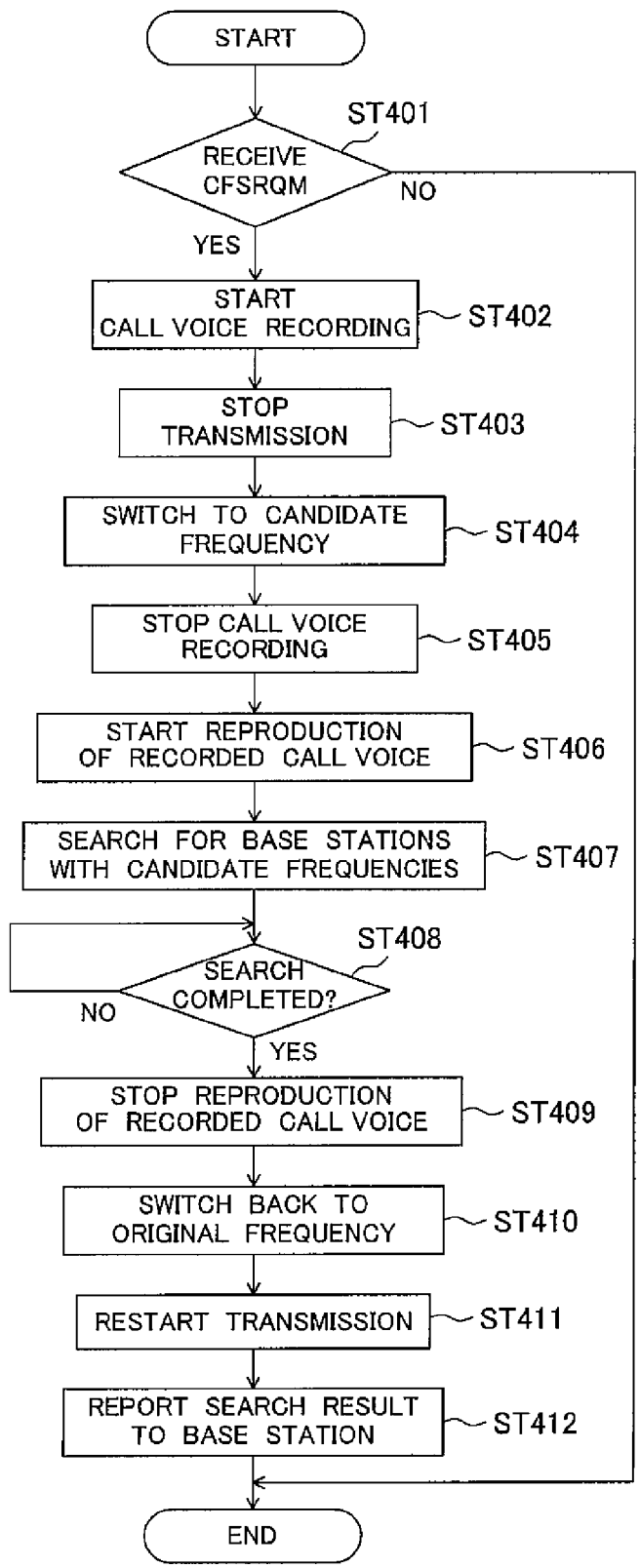
FIG. 4 A flow chart cited for explaining the operation of a radiophone apparatus according to an embodiment of the present invention.

FIG. 4 is a flow chart cited for explaining the operation of a radiophone apparatus according to an embodiment of the present invention.

Below, a detailed explanation will be given of the operation of the radiophone apparatus 1 according to the embodiment of the present invention shown in FIG. 3 with reference to the flow chart shown in FIG. 4.

The radiophone apparatus 1 (hand-off processing part 120 of the control part 12) can start the MAHHO operation by receiving a search request of the hand-off candidate frequencies (CFSRQM) from the base station 2 (ST401).

The hand-off processing part 120 activates the voice recording and/or output part 126 at this timing. Due to this, the voice recording and/or output part 126 starts the recording of the voice and stores it in a recorded voice file 128 (ST402). This means that the voice received from the other party of call at the communication part 11, decoded at the voice processing part 14, and analog-converted is stored.

Then, when the transmission is stopped (ST403), and a hand-off candidate frequency is switched to (ST404), the voice recording and/or output part 126 immediately stops the recording under the control of the hand-off processing part 120 (ST405).

At this time, the voice recording and/or output part 126 outputs the voice which was recorded immediately before or white noise etc., drives the speaker 15 through the voice processing part 14, and outputs and plays back the voice (ST406). Due to this, the interruption of the downlink voice of the silent section can be covered. Namely, by reproducing and outputting pseudo voice matching with the section of the interruption of sound during the hand-off candidate frequency search, the user can be prevented from being aware of the sound interruption section.

Note that, the hand-off processing part 120 controls the search control part 123 and makes it execute the search of base stations with hand-off candidate frequencies (ST407). At this time, the voice recording and/or output part 126 stops the reproduction (ST409) before the candidate frequency search is completed (ST408 "Yes") and the switching from the hand-off candidate frequency to the original frequency before the switching is carried out. At this time, simultaneously, the voice output path switching part 127 performs the control for switching the voice to be played back at the speaker 15 through the voice processing part 14 from the recorded voice to the call voice at the timing of suspension of outputting of the recorded voice when the search processing is completed and the original frequency before the switching is reset to.

Next, the hand-off processing part 120, along with the completion of search (ST408 "Yes"), restarts the transmission by switching back to the original frequency before the switching (ST410, ST411). Then, the hand-off processing part reports the hand-off candidate frequency search result as CFSRPM to the base station 2 issuing the request (ST412).

The pattern applied in the embodiment of the present invention described above is only for the case where a periodic search start request of the search type=3 is received. The reason for this is that a report must be returned back to the base station 2 only one time in the case of a single search start request of the search type=1 and the hand-off candidate frequency search required for that is kept to 1 to 2 times, therefore this does not become a serious problem in the same way as the sound interruption due to deterioration of wireless quality at the time of normal call. Further, this is because the search processing must be immediately started when a search request is received from the base station 2, so there is no time for back-up of the voice at this time.

With respect to the search cycle (about 0.48 to 200 seconds) designated by the network by receiving the periodic search start request from the base station 2, the present time is defined as x, and the search period is defined as y. At this time, the timing when the hand-off candidate frequencies must be searched for becomes after ((x+y)−z) seconds counting backward the time by z taken for the candidate frequency search from the timing (x+y) when the report must be sent to the base station 2. For example, when the search period is 2 seconds, if it is assumed that 0.5 second is required for the search, the interval from the reception of a search start request to when the search is actually carried out becomes after about 1.5 seconds.

Accordingly, by recording the voice for that interval and assigning the voice recorded immediately before that to the silent section if the silent section is now generated due to the hand-off candidate frequency search, the user can be prevented from being aware of the silent section.

The overhead of the processing required for starting and/or stopping the recording depends upon the performance of the CPU configuring the control part 12. Due to technical advances, only a delay of an extent not sounding strange to the human ear is caused. Therefore, even a very short duration in terms of human senses from the reception of the start request of the hand-off candidate frequency search to the start of the hand-off candidate frequency search can be sufficiently utilized as back-up voice.

The silent section generated by the hand-off candidate frequency search more precisely depends upon the search window size and the number of base stations 2 to be searched, but is approximately 150 milliseconds at the longest. For this reason, the voice (data) necessary for preventing a user from becoming aware of a silent section need only be data having a length of about 200 milliseconds. Accordingly, the voice recording file 128 storing voice need only have a capacity enabling a buffer region having a size capable of storing 200 milliseconds' worth of the voice to be assigned. If the tail end of the buffer region is reached during the recording, the recording is continuously carried out by returning back to the head of the buffer region, and the reproduction is carried out from the oldest data in the buffer.

By performing FIFO control in this way, if 200 milliseconds' worth of voice can be once recorded, whenever the recording ends after that, the voice backup of an extent necessary for preventing the user from becoming aware of a silent section can be obtained.

As explained above, according to the radiophone apparatus according to the embodiment of the present invention, by paying attention to the sound interruption in the hand-off candidate frequency search up to when the hard hand-off is reached, particularly a conspicuous sound interruption in the periodic search start request, a system can be constructed in which, not silent data or camouflage of noise by white noise, but content actually spoken by a user is recorded as a voice and assigned to the silent section, whereby the interruption of voice can be made unnoticeable. In this case, realization becomes possible by using existing hardware of the radiophone apparatus 1 and partially improving the software without exerting an influence upon the configuration of the network.

In this way, the sound interruption occurring in a periodic candidate frequency search which is carried out during a MAHHO operation can be made as unremarkable as possible or eased. The effect obtained according to the present invention is that rather than the mode of operation of correctly restoring the interrupted voice, the user is made to sense that a call is going to be disconnected by occurrence of a silent section during the call, that is, an action inhibiting the user from feeling uneasy can be expected.

Note that, at this time, the backed up voice is the voice generated by the user just before the silent time and played back with a delay, therefore correctness of the voice is not guaranteed. For example, assume that, when saying "A-B-C-D-E", "C" is lost resulting in "A-B-D-E" due to the hand-off candidate frequency search.

According to the present invention, this is repaired to "A-B-B-D-E" and is heard as such by the other party in the conversation. This is not correct, but the human ear has the ability of automatically correcting it so that the meaning can be understood so far as the replacement is about 200 milliseconds in length, therefore the meaning should be understood.

Further, the sound is not interrupted, but heard continuously, therefore this is useful for improving a stable feeling of the sound quality. Further, if the sound is continuous such as music or noise, the sound interruption of MAHHO is further remarkable. However, a conspicuous effect is indeed exhibited against such sound interruption. This is because there is the action of repeating the sound immediately before that, therefore a situation where a sound with a little change is continuously heard is more easier to camouflage, and the feeling of strangeness due to the camouflage is considered to be small.

Note that, the flow chart shown in FIG. 4 shows steps of the hand-off method in the wireless communication system of the present invention together other than the explanation of the operation of the radiophone apparatus according to the embodiment of the present invention.

Namely, the hand-off method in the wireless communication system according to the embodiment of the present invention is a hand-off method for continuing wireless communication by switching from the base station 2 communicated with at present (base station A) to another base station 2 (base station B) in a wireless communication system provided with a plurality of base stations 2 and the radiophone apparatus 2 performing wireless communication communicating with a plurality of base stations 2, having a step (ST402) of starting the recording of received voice when the radiophone apparatus 1 receives a search request for hand-off candidate frequencies from the base station 2 being communicated with (base station A), steps (ST405, ST406) of stopping the recording and starting outputting of the recorded voice when performing the capture operation by switching from the frequency in use at present to the hand-off candidate frequency, and steps (ST407 to ST409) of stopping the recorded voice output before the search of the hand-off candidate frequency is completed and the frequency before the switching is reset.

According to the hand-off method in the wireless communication system according to the embodiment of the present invention described above, the sound interruption occurring at a periodic candidate frequency search carried out during a MAHHO operation can be eliminated or eased.

Note that, the present invention is not limited to the above embodiment. Namely, by not applying the present invention to the case where the start request of the single search is received, the trouble of always buffering the recorded voice file 128 can be eliminated. Further, the data may be acquired according to need as well by buffering the recorded voice file 128 on occasion. Note that, needless to say the present invention can be applied to the case where a start request of the single search is received as well.

At the time of carrying out the present invention, various modifications, combinations, sub-combinations, and alterations may occur depending on components of the above embodiment insofar as they are within the scope of the appended claims or the equivalents thereof.

Further, in the above embodiment, an explanation was given of the wireless communication system 100 compatible with three types of frequency bands of the old 800 MHz, new 800 MHz, and 2 GHz bands, but the present invention is not limited to the above bands. It may be a wireless communication system for a frequency other than the three types described above as well. The number of types of compatible frequency bands is not limited to three types either, but may be any number of types as well.

The invention claimed is:

1. A radiophone apparatus comprising:
   a communication part selecting one frequency from among a plurality of frequencies, and performing wireless communication communicating with a base station;
   a control part switching a frequency used by the communication part, and controlling the wireless communication; and
   a speaker outputting a call voice based on a voice signal received by the communication part, wherein
   the control part makes the speaker output a pseudo voice immediately after a switch to a hand-off candidate frequency and prior to receiving a handoff request to perform a capture processing.

2. A radiophone apparatus as set forth in claim 1, characterized in that the control part suspends output of the pseudo voice and returns to a frequency in use prior to switching to the hand-off candidate frequency, when capture processing is completed.

3. A radiophone apparatus as set forth in claim 1, characterized in that
   said radiophone apparatus further comprises a memory part, and
   the control part makes the memory part store call voice data based on the voice signal received by the communication part and makes the speaker output the call voice of the stored call voice data as the pseudo voice.

4. A radiophone apparatus as set forth in claim 3, characterized in that the control part starts storage of the call voice data based on the voice signal received by the communication part in the memory part when the communication part receives a search request, stops storage of the call voice data based on the voice signal before switching a frequency to be used by the communication part from a frequency in use at present to the hand-off candidate frequency, then makes the speaker output the pseudo voice based on the stored call voice data.

5. A radiophone apparatus as set forth in claim 1, characterized in that the control part outputs the pseudo voice after receiving a search request including a request for performing processing for capture of hand-off candidate frequencies several times.

6. A radiophone apparatus as set forth in claim 5, characterized in that
said radiophone apparatus further comprises a memory part, and
the control part makes the memory part store call voice data based on the voice signal received at the communication part until a frequency in use at present is switched to the hand-off candidate frequency and makes the speaker output the call voice based on the stored call voice data as the pseudo voice after receiving a request of performing the capture processing search several times.

7. A hand-off method in a radiophone apparatus continuing wireless communication by switching a communication channel from a base station in communication at present to another base station in a radiophone apparatus engaging in wireless communication with a plurality of base stations, said method comprising:
   a reception step of receiving a search request of hand-off candidate frequencies during call;
   a capture processing step of switching from the frequency in use at present to a hand-off candidate frequency prior to receiving a handoff request and performing capture processing after the reception step;
   a storing step of storing call voice data based on a received voice signal between the reception step and the capture processing step; and
   a voice outputting step of outputting a pseudo voice based on a voice signal received by a communication part immediately after the switch to the hand-off candidate frequency in the capture processing step.

8. A hand-off method in a radiophone apparatus as set forth in claim 7, characterized by further including a return step of stopping the voice outputting step, then returning to the frequency in use prior to switching to the hand-off candidate frequency, when the capture processing ends.

9. A communication system comprising:
   a base station; and
   a radiophone apparatus selecting one frequency from among a plurality of frequencies, and performing wireless communication communicating with the base station, wherein
   the radiophone apparatus comprises
      a communication part,
      a control part switching a frequency used by the communication part and executing the wireless communication, and
      a speaker outputting a call voice based on a voice signal received by the communication part, wherein
   the control part makes the speaker output a pseudo voice immediately after a switch to a hand-off candidate frequency and prior to receiving a handoff request to perform a capture processing.

* * * * *